April 10, 1956     E. STUMP     2,741,229
PRECHAMBER COMPRESSION IGNITION ENGINE
Filed Jan. 15, 1952     3 Sheets-Sheet 1

Inventor
Eugen Stump
By Hicke & Padlon
Attorneys

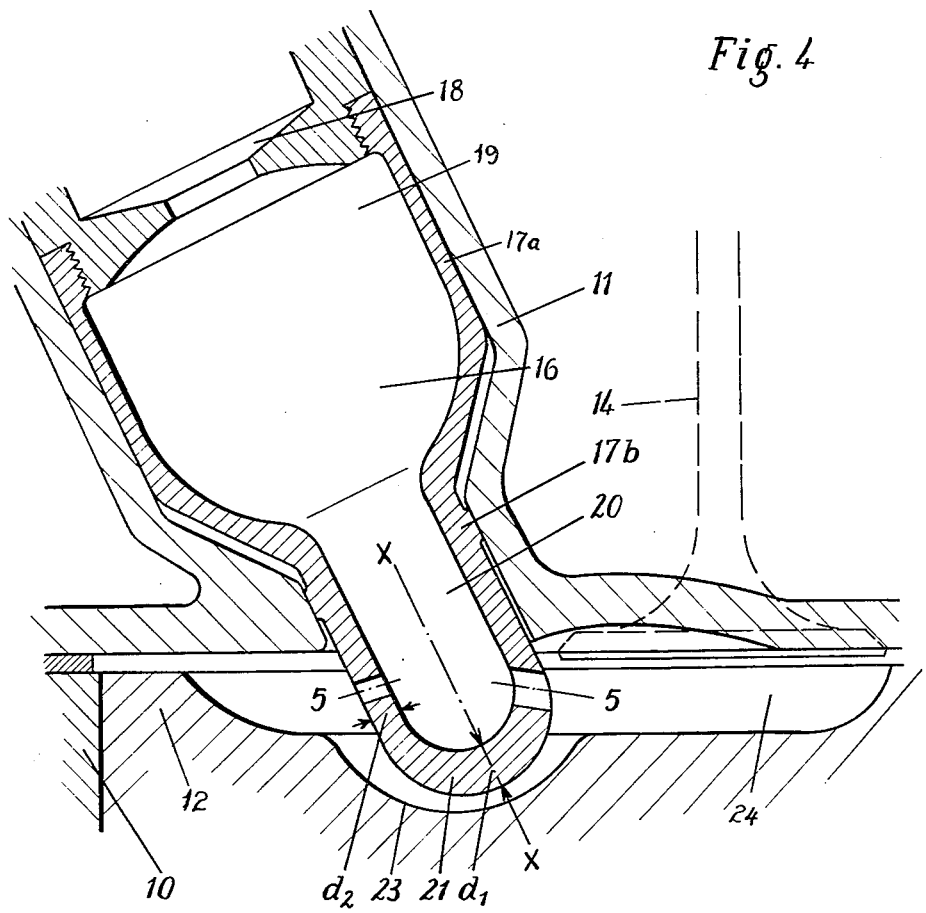

United States Patent Office 2,741,229
Patented Apr. 10, 1956

2,741,229

PRECHAMBER COMPRESSION IGNITION ENGINE

Eugen Stump, Stuttgart-Unterturkheim, Germany, assignor to Daimler-Benz Aktiengesellschaft, Stuttgart-Unterturkheim, Germany Application January 15, 1952, Serial No. 266,479

Claims priority, application Germany January 16, 1951

16 Claims. (Cl. 123—32)

The present invention relates to an injection internal-combustion engine with a prechamber, which is in communication with the main combustion space, which is provided with a recess in the head of the piston, through individual passage openings, which are directed towards the circumferential parts of the main combustion space.

It is an object of the present invention to obtain improved thermal conditions for the combustion in the main combustion space as well as an improved mixture of the contents of the prechamber, which passes from the prechamber into the main combustion space while already partially burning with the air, which is displaced by the piston into the main combustion space during the compression stroke.

A further object of the present invention is a thermal relief of the piston head by appropriate discharge of the contents of the prechamber into the main combustion space.

A further object of the present invention is an improved heat flow and a longer working life of the inserted head, which projects into the cylinder space.

A further object of the present invention is a suitable development of the main combustion space to achieve the smallest possible detrimental space outside the part of the piston recess, which is supplied by the prechamber contents, and of a favorable guidance of the prechamber contents along the bottom of the piston recess.

Figure 1:
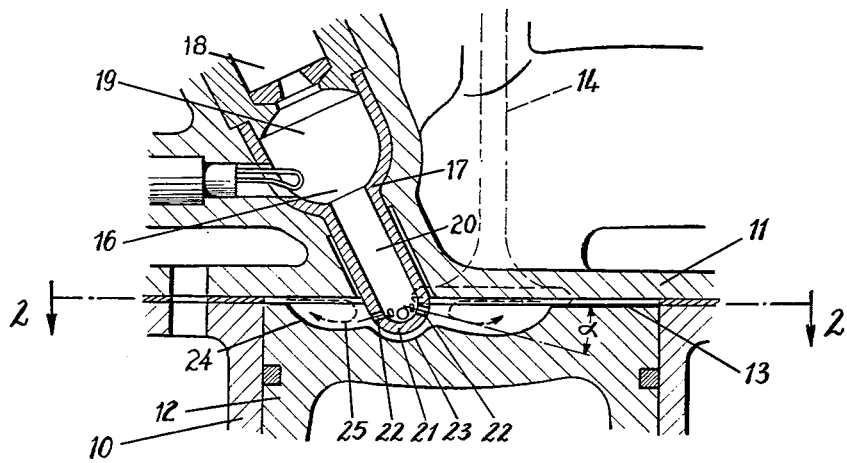
Figure 2:
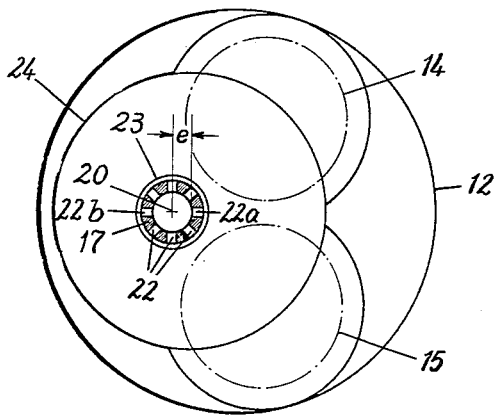
Figure 3:
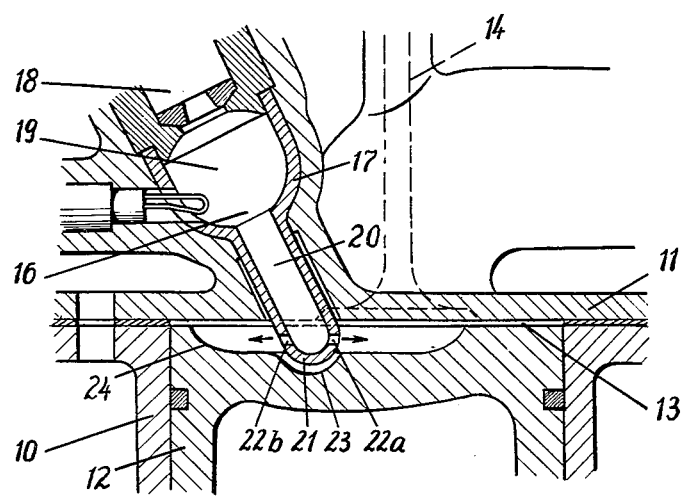

Further objects of the present invention are to be taken from the following description of several embodiments in accordance with the present invention when taken in connection with the accompanying drawing, wherein:

Fig. 1 is an axial section through the cylinder and prechamber axis of an embodiment of the engine, Fig. 2 is a horizontal section along the line 2—2 of Fig. 1, Fig. 3 is an axial section through another embodiment, Fig. 4 is an axial section through a third embodiment, Fig. 5 is a horizontal section along the line 5—5 of Fig. 4.

The piston 12 moves in the cylinder 10, which is covered at the top by the cylinder head 11, in such a manner that its outer piston edge 13 moves as closely as possible to cylinder head 11. In the cylinder head, for example, a prechamber 16 is arranged laterally on the side of an inlet valve 14 and an outlet valve 15 obliquely and eccentrically to the cylinder axis, the wall of which prechamber is shaped by an insert 17 and which consists of a combustion space part 19, which is adjacent to the injection nozzle 18, extended and for example about ball-shaped, and of a canal-shaped space 20, which is arranged towards the main combustion space coaxially to the injection nozzle 18.

The insert 17, which forms the prechamber, projects with its lowermost, about semi-spherically rounded end-wall 21 relatively far into the main combustion space, whereby the canal-shaped space part 20 is connected with the main combustion space by, for example, eight passage openings 22, which are distributed along the circumference.

The main combustion space is thereby formed by a recess in the piston head, which consists of a central partial recess 23 and a ring-shaped partial recess 24, which surrounds the latter. The recesses are developed and shaped in such a manner that, as Fig. 2 shows, the wall of the recess 23 approaches as closely as possible the end wall 21 of the prechamber in the piston dead center position.

The rounded walls of the ring-shaped recess 24 thereby join directly tangentially the prechamber in the upper dead center.

In Fig. 1 the passage openings 22 are inclined at an angle of for example 10 to 20° to the piston bottom or to a plane, which is perpendicular to the cylinder axis.

During the compression stroke of the piston the combustion air is displaced by the outer piston edge to the inside into the ring-shaped recess 24, so that ring-shaped whirls 25 are formed in the ring-shaped recess 24. The contents of the prechamber, which leave the openings 22, are seized directly by these air whirls and guided to the outside of the main combustion chamber in direction of the bottom walls of the recesses 24, whereby they are distributed equally over the main combustion space.

As Fig. 2 particularly shows, the central partial recess 23 of the piston head and therewith the end of the prechamber, which projects into the main combustion space, are displaced eccentrically by an amount $e$ to the center of the outer partial recess 24, i. e., to that side of the main combustion space, to which the prechamber is located eccentrically with respect to the cylinder axis. The passage openings 22 can thereby be adapted to this eccentric arrangement, in that the passage openings 22, which are located towards the cylinder axis or the center of the ring-shaped recess are made of larger cross-section than the openings, which are opposite to them, for example, the opening 22a the largest, the opening 22b the smallest cross-section, whereby the cross-section of the individual openings can be graded from the one to the other side in accordance with the combustion space parts, which are supplied with fuel.

Through the fact that the wall of the central recess 23 in the upper piston dead center moves very close to the end of the prechamber, which projects into the main combustion chamber, dead spaces within the prechamber are avoided, in which otherwise a poor mixture of fuel would take place. The rounded end of the prechamber insert results in a favorable heat flow to the cylindrical parts of the insert and an advantageous reception of thermal stresses.

If desired, provision can also be made for a substantially sector-shaped recess, particularly with a strongly eccentric prechamber, instead of a ring-shaped recess. The ring-shaped recess can also be subdivided into several separate sectors, for example, in such a manner that an individual sector is correlated to each passage opening.

The embodiment according to Fig. 3 distinguishes itself substantially from the one according to Figs. 1 and 2 by the fact that the bottom walls of the outer partial recesses 24 in the piston head adjacent the central partial recess 23 form a plane, which is perpendicular to the cylinder axis, and the bores 22a and 22b, which are arranged above the rounded bottom 21 in the insert, run perpendicular to the axis of the cylinder and parallel to the bottom surface of the recess 24, which forms the main combustion space and is arranged eccentrically to the cylinder axis.

In the embodiment according to Figs. 4 and 5 the insert, which is formed by the upper extended part 17a, the cylindrical part 17b and the bottom 21, projects again relatively far into the main combustion space, so that in the upper piston dead center position the insert bottom 21 enters into the local central recess 23 of the piston head.

The insert bottom 21 is thereby semi-spherically adjacent to the cylindrical part 17b of the insert and shows bores 22 at its circumference, of which the bores, which are located towards the cylinder axis, have a larger diameter than the bores, which are located towards the opposite side and are graded in a decreasing manner from the bore 22a to the bore 22b. The grading is thereby again adapted in each case to the space parts of the main combustion space, which are to be supplied with fuel. The bores are furthermore inclined slightly downwardly towards the piston head.

The insert bottom 21 is furthermore shaped in such a manner that the center for the inner wall surface of the bottom is located above the center for the outer wall surface, i. e., the bottom has in the axial direction $x$—$x$ of the prechamber a larger wall thickness $d_1$ than in the cylindrical part 17b where it is designated by $d_2$.

Such an insert has proven particularly durable with regard to high thermal stresses. A burning through of the insert at the place of the wall, which separates the interior of the insert from the main combustion space and which is subjected to the greatest thermal loads, will no longer occur.

In spite of the decreasing wall-thickness towards the circumference of the insert the heat can flow off sufficiently into the cylindrical part of the insert and from there to the water-cooled walls of the circumference, as a cross section which increases according to the diameter, provides a path for the flowing off or conduction of the heat in a radial direction from the axis of the insert.

The present invention is suitable for engines of all kinds, of paricular advantage, however, for such engines, which, as in the case of motor vehicle engines, have to operate under strongly different conditions with great differences in the numbers of revolution.

What I claim is:

1. In an internal combustion engine a cylinder space, a piston reciprocating in said cylinder space and provided with a piston head, a cylinder head, a prechamber forming a substantial part of the combustion chamber, a member in said prechamber extending into said cylinder space and including an end wall to close said member against said cylinder space, an injection nozzle terminating in said prechamber for injecting the fuel under pressure into said prechamber for at least partial ignition therein, a recess in said piston head surrounded by an essentially unrecessed piston rim and forming the main combustion chamber, a substantially centrally located additional recess within said first-mentioned recess, said additional recess being surrounded in a ring-like manner by said first-mentioned recess with the edge delimiting said additional recess against said first-mentioned recess lying below said unrecessed piston rim, said prechamber and said additional recess being so located with respect to each other that in the top dead center position of said piston the end wall of said member projects into said additional recess and is closely surrounded therein by the piston head, and discharge openings in said end wall for connecting said prechamber with said main combustion chamber, said openings being arranged circumferentially in said end wall above said delimiting edge with said piston in top dead center position and with the axes of said openings directed approximately in the direction of the walls forming said unrecessed rim whereby the injected charge is deflected upwardly by said unrecessed rim.

2. In an internal combustion engine, the combination according to claim 1, wherein said additional recess is developed as a rounded recess and said end wall projecting into said additional recess is developed in a corresponding rounded manner.

3. In an internal combustion engine, the combination according to claim 1, wherein said additional recess is of substantially partial spherical shape with said end wall projecting into said additional recess being shaped substantially semi-spherically.

4. In an internal combustion engine, the combination according to claim 1, further comprising an insert member covering said prechamber, said insert member including said first-mentioned member.

5. In an internal combustion engine, the combination according to claim 1, wherein the piston head walls forming said first-mentioned recess extend radially from said delimiting edge to said unrecessed rim in a plane substantially perpendicular to the cylinder axis, and wherein the axes of said openings are substantially parallel to said plane.

6. In an internal combustion engine, the combination according to claim 1, wherein the piston head walls forming said first-mentioned recess extend radially from said delimiting edge to said unrecessed rim in a plane forming an angle of about 70 to 80 degrees with the cylinder axis, and wherein the axes of said openings are substantially parallel to said plane.

7. In an internal combustion engine, a cylinder space, a piston reciprocating in said cylinder space and provided with a piston head, a cylinder head, a prechamber forming a substantial part of the combustion chamber, a member in said prechamber extending into said cylinder space and including an end wall to close said member against said cylinder space, an injection nozzle terminating in said prechamber for injecting fuel under pressure into said prechamber for at least partial ignition therein, a recess in said piston head surrounded by an essentially unrecessed piston rim and forming the main combustion chamber, an additional recess within said first-mentioned recess, said additional recess being surrounded by said first-mentioned recess with the edge delimiting said additional recess against said first-mentioned recess lying below unrecessed rim, said prechamber and said additional recess being so located with respect to each other that in the top dead center position of said piston the end wall of said member projects into said additional recess to be spaced a small distance from the piston head, and a plurality of discharge openings distributed circumferentially in said end wall above said delimiting edge, the axes of said openings extending radially above the piston head walls forming said first-mentioned recess with the piston in top dead center position, said prechamber being located eccentrically and obliquely with respect to the cylinder axis, said first-mentioned recess being located eccentrically with respect to the cylinder axis, and said additional recess being located eccentrically with respect to said first-mentioned recess toward the side of eccentricity of said prechamber with respect to said cylinder axis.

8. Injection internal-combustion engine according to claim 7, wherein the said openings have a smaller cross-section towards that side of the main combustion space, towards which the prechamber is located eccentrically to the cylinder axis, than the openings, which are directed towards the opposite side.

9. In an internal combustion engine, the combination according to claim 7, wherein said prechamber includes a part with a relatively large diameter adjacent said injection nozzle, and a part with a relatively small diameter and of greater length than said relatively small diameter located toward the main combustion chamber in the direction of said injection nozzle, further comprising a common insert member forming the walls of both of said parts and of said first-mentioned member.

10. In an internal combustion engine, the combination according to claim 7, wherein the piston head walls forming said first-mentioned recess lie in a plane substantially perpendicular to the cylinder axis, and wherein said openings lie in a plane also substantially perpendicular to the cylinder axis whereby the contents of said prechamber are distributed in said main combustion chamber closely above the piston head with the piston in top dead center position.

11. In an internal combustion engine, the combination according to claim 1, wherein said end wall is substantially semi-spherically shaped with the wall thickness of the bottom of the center thereof being greatest and decreasing gradually toward the circumference.

12. In an internal combustion engine, the combination according to claim 1 wherein said prechamber is located obliquely and eccentrically with respect to the cylinder axis, and wherein said openings are formed by bores having a different cross section.

13. In an internal combustion engine, the combination according to claim 1 wherein said prechamber is located obliquely and eccentrically with respect to the cylinder axis, and wherein said openings are formed by bores having a different cross section with the axes of said bores directed slightly obliquely toward the walls constituting the piston head.

14. In an internal combustion engine, the combination according to claim 1 wherein said first-mentioned recess is substantially flat.

15. In an internal combustion engine, a cylinder space, a piston reciprocating in said cylinder space and provided with a piston head, a cylinder head, a prechamber, a member in said prechamber extending into said cylinder space and including an end wall to close said member against said cylinder space, an injection nozzle terminating in said prechamber for injecting the fuel under pressure into said prechamber for at least partial ignition therein, a recess in said piston head surrounded by an essentially unrecessed piston rim and forming the main combustion chamber, a substantially centrally located additional recess within said first-mentioned recess, said additional recess being surrounded in a ring-like manner by said first-mentioned recess and being separated therefrom by a delimiting edge, said prechamber and said additional recess being so located with respect to each other that in the top dead center position of said piston the end wall of said member projects into said additional recess and is closely surrounded therein by the piston head, and discharge openings in said end wall for connecting said prechamber with said main combustion chamber, said openings being arranged circumferentially in said end wall above said delimiting edge with said piston in top dead center position and with the axes of said openings directed above said delimiting edge into said first-mentioned recess in the top dead center position of the piston and approximately in the direction of the walls forming said essentially unrecessed rim whereby the injected charge is deflected upwardly by said unrecessed rim.

16. In an internal combustion engine, a cylinder, a piston having a piston head reciprocable in said piston, a cylinder head, a prechamber located in said cylinder head, a recess in said piston head forming the main combustion chamber, the substantially unrecessed portion of said piston head closely approaching said cylinder head in the dead center position of said piston, an additional recess within said first-mentioned recess, an insert member in said prechamber and extending with a portion thereof into said additional recess, said additional recess and said portion being of substantially complementary shape so that said portion is surrounded to a substantial extent by the walls of said piston head constituting said additional recess, said portion being closed off against said piston head, and discharge openings providing a communication between said prechamber and said main combustion chamber, said discharge openings being located in said portion and directed outwardly thereof in such a manner that in the top dead center position of the piston the axes of said openings are directed into said first-mentioned recess in a plane above the piston head walls forming said first-mentioned recess.

References Cited in the file of this patent

UNITED STATES PATENTS

| 1,524,894 | Thomson et al. | Feb. 3, 1925 |
| 1,693,966 | Sperry | Dec. 4, 1928 |
| 2,331,801 | Rodgers | Oct. 12, 1943 |

FOREIGN PATENTS

| 439,426 | Great Britain | Dec. 6, 1935 |
| 368,253 | Italy | Feb. 11, 1939 |
| 408,508 | Italy | Jan. 2, 1945 |
| 216,497 | Switzerland | Dec. 1, 1941 |

OTHER REFERENCES

Ser. No. 368,293, Von Mallinckrodt (A. P. C.), published May 11, 1943.